B. G. LAMME.
DYNAMO ELECTRIC MACHINE.
APPLICATION FILED MAY 2, 1917.

1,316,798.

Patented Sept. 23, 1919.
2 SHEETS—SHEET 1.

WITNESSES:
William Siler
O. W. Kennedy

INVENTOR
Benjamin G. Lamme.
BY
Besley G. Carr
ATTORNEY

B. G. LAMME.
DYNAMO ELECTRIC MACHINE.
APPLICATION FILED MAY 2, 1917.

1,316,798.

Patented Sept. 23, 1919.
2 SHEETS—SHEET 2.

WITNESSES:
William Siler
O. U. Kennedy

INVENTOR
Benjamin G. Lamme
BY
Wesley G. Carr
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

1,316,798.	Specification of Letters Patent.	Patented Sept. 23, 1919.

Application filed May 2, 1917. Serial No. 165,838.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines, and it has particular relation to damping windings that are adapted to be used in connection with the rotors of high-capacity, single-phase turbo-generators and similar machines that carry unbalanced electrical loads.

The object of my invention is to provide a damping winding that shall be particularly strong and capable of withstanding the stresses set up by centrifugal force during the operation of the machine and which shall be entirely supported by the rotor core independently of the various coil-supporting devices usually employed in connection therewith.

In the construction of rotors of the above-described type, it has heretofore been customary to make the coil-retaining wedges that are carried by the core of non-magnetizable conducting material and to extend them beyond the ends of the core member. The wedges were thus adapted to serve as part of the damping winding and were connected together at their respective ends by means of rings located between the overhanging end portions of the coils and the annular supports usually provided therefor. However, it has been found difficult to provide a satisfactory electrical connection between the rings and the ends of the damper bars or wedges. The above described construction possessed an additional disadvantage because of the fact that it was necessary to remove the whole damper structure whenever it was found desirable to replace or repair one of the rotor coils.

According to the present invention, I provide a damper winding in which the end ring is supported independently of the overhanging end portions of the coils so that the damper bars may be permanently connected thereto.

Figure 1:
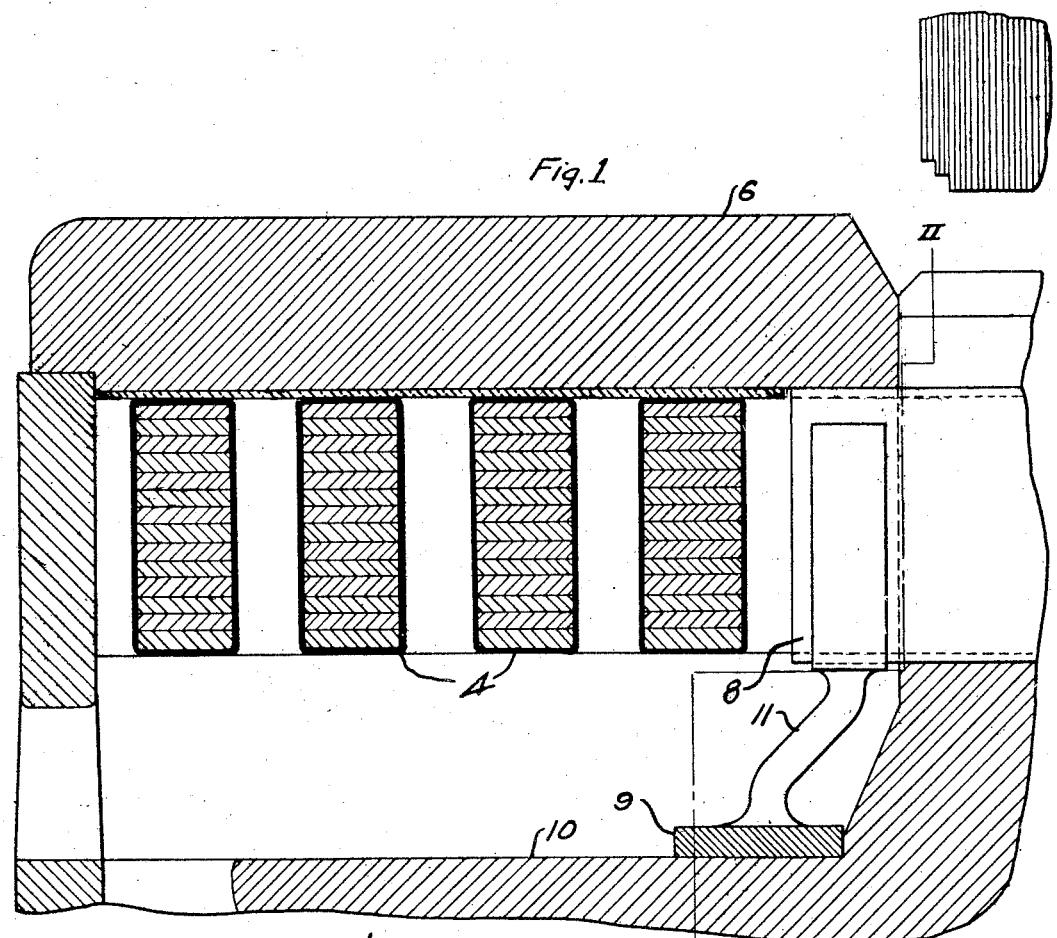
Figure 2:
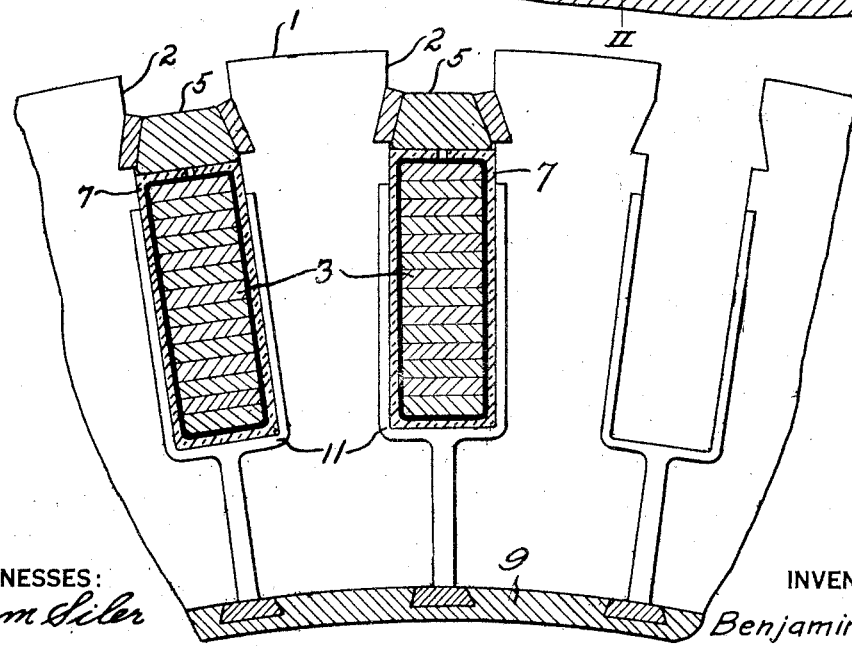
Figure 3:
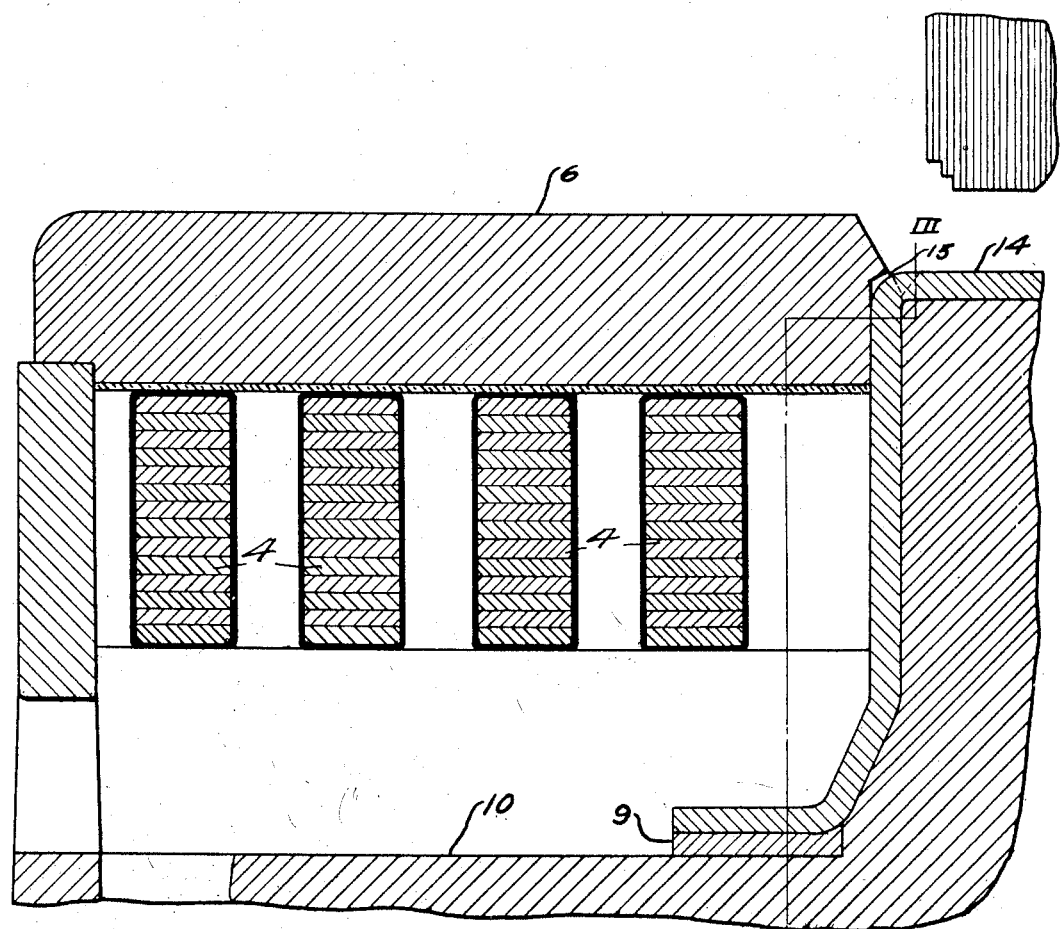

In the accompanying drawings, Figure 1 is a sectional view of a portion of an alternating-current generator taken in a radial plane; Fig. 2 is a transverse sectional view along the line II—II of Fig. 1; Fig. 3 is a view, similar to Fig. 1, showing a modification of my invention, and Fig. 4 is a sectional view along the line III—III in Fig. 3.

A magnetizable core member 1 is provided with a plurality of radial slots 2 within which are located coils 3 having overhanging end portions or end turns 4. The coils 3 are maintained in the slots 2 by means of coil-retaining devices or wedges 5 which are preferably composed of a non-magnetizable conducting material, such as copper or brass. The overhanging end portions 4 of the coils 3 are supported by an annular member 6, preferably composed of a material having high tensile strength in order to resist any tendency for the end turns 4 to be displaced under the influence of centrifugal force.

Each coil 3 is surrounded by an envelop or cell 7, preferably composed of copper, which is in intimate engagement with the coil-retaining wedge 5. Each cell projects beyond the respective ends of the core member 1, as shown at 8. A ring 9, preferably composed of copper, is mounted on a reduced portion 10 of the core member 1 and is located entirely within, and spaced from, the overhanging end portions 4. The ring 9 is connected to the projecting portions 8 of the cells 7 by connecting members 11 that are welded or otherwise secured to the cells 7 and are dove-tailed into the ring 9, or are formed integral therewith.

Figure 4:
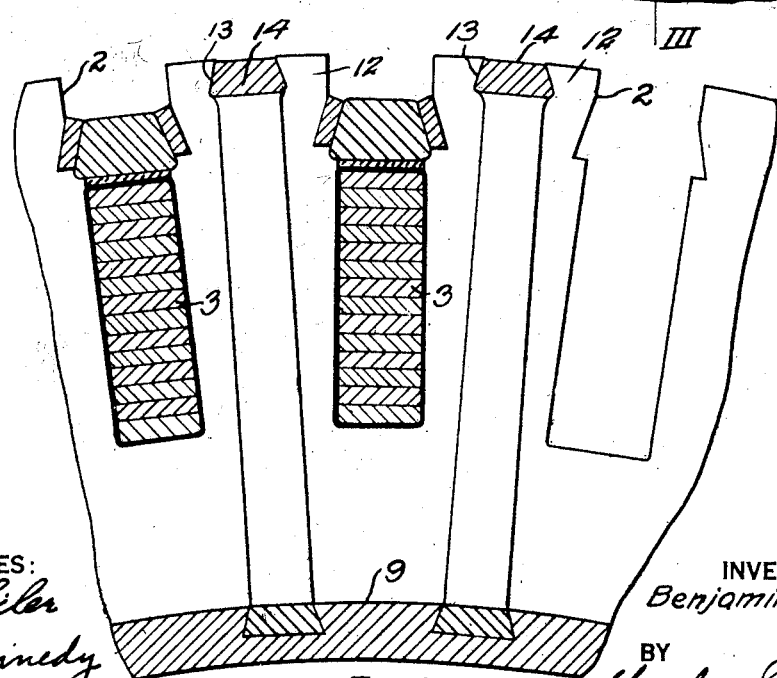

In the modification shown in Figs. 3 and 4, the teeth 12 between the slots 2 are provided with longitudinal grooves 13 within which are located damper bars 14. The bars 14 are bent downwardly at the respective ends of the core 1, slots 15 being provided in the supporting ring 6 for the reception of the bars 14. The ends of the bars are dove-tailed into, or otherwise secured to, the short-circuiting ring 9 which is mounted upon a reduced portion 10 of the core 1, thus completing the damper winding.

From the foregoing, it is apparent that a damper winding constructed in accordance with my invention may be readily applied to the core member and that the connections between the damper bars and the short circuiting rings may be made permanent because of the fact that the ring is rigidly mounted upon the core member. In the structure shown in Figs. 1 and 2, it is only necessary to turn back the tops of the cells in order to remove any one of the coils 3, while, in the modification shown in Figs. 3 and 4, the damper winding is entirely independent of the coils 3.

While I have shown my invention as applied to a particular type of rotor structure, it is not so limited but may be as readily applied to other types of dynamo-electric machines and I desire that only such limitations shall be imposed thereon as come within the scope of the appended claims.

I claim as my invention:

1. In a dynamo-electric machine, the combination with a slotted core member, of a conducting lining member lying in a slot thereof, a conductor lying with said lining member and surrounded thereby, and a conducting connection between the ends of said lining member and non-adjacent to said conductor, whereby a damping effect is produced upon abrupt current changes tending to occur in said conductor.

2. In a dynamo-electric machine, the combination with a slotted core member, of conducting cells disposed in slots thereof and joined at the ends of said core member, and a winding disposed within said cells, whereby said cells exert a damping effect upon sudden flux changes tending to take place within said core member.

3. In a dynamo-electric machine, the combination with a core provided with slots and a plurality of coils located in said slots and having overhanging end portions, of an independent damping device having one portion thereof located within said overhanging end portions and supported by said core member.

4. In a dynamo-electric machine, the combination with a core provided with slots and a plurality of coils located in said slots and having overhanging end portions, of an independent damping grid having portions thereof embedded in said core member and other portions thereof located within said end portions and supported by said core member.

5. In a dynamo-electric machine, the combination with a core provided with slots and a plurality of coils located in said slots and having overhanging end portions, of an independent damping grid having portions thereof surrounding said coils and other portions thereof located within, and spaced from, said end portions and supported by said core member.

In testimony whereof, I have hereunto subscribed my name this 24th day of April, 1917.

BENJ. G. LAMME.